United States Patent [19]

Villa et al.

[11] Patent Number: 4,668,132
[45] Date of Patent: May 26, 1987

[54] CUTTING TOOL

[75] Inventors: Gino Villa, Milan, Italy; John R. Johnson, Sandy; Alan A. Hale, Berkhamsted, both of United Kingdom

[73] Assignee: General Electric Company, Detroit, Mich.

[21] Appl. No.: 884,886

[22] Filed: Jul. 11, 1986

Related U.S. Application Data

[62] Division of Ser. No. 657,297, Oct. 3, 1984, abandoned.

[30] Foreign Application Priority Data

Oct. 3, 1983 [GB] United Kingdom ............... 8326441

[51] Int. Cl.⁴ .......................................... B23B 27/08
[52] U.S. Cl. ...................................... 407/117; 407/72; 407/110; 407/116
[58] Field of Search ................ 407/50, 72, 109, 110, 407/114, 115, 116, 117, 66; 83/839, 844

[56] References Cited

U.S. PATENT DOCUMENTS

| | | | |
|---|---|---|---|
| 3,660,877 | 5/1972 | Stein | 407/117 |
| 3,748,710 | 7/1973 | Lynch | 407/117 |
| 3,785,021 | 1/1974 | Norgren | 407/117 |
| 4,195,956 | 4/1980 | Mihic | 407/114 |
| 4,202,651 | 5/1980 | St. Jean | 407/91 |

FOREIGN PATENT DOCUMENTS

| | | |
|---|---|---|
| 0059602 | 9/1982 | European Pat. Off. . |
| 1069769 | 7/1954 | France .................... 407/72 |
| 790805 | 2/1958 | United Kingdom . |
| 1254578 | 11/1971 | United Kingdom . |
| 1370210 | 10/1974 | United Kingdom . |
| 1379637 | 1/1975 | United Kingdom . |
| 2064390 | 6/1981 | United Kingdom . |
| 2082485 | 3/1982 | United Kingdom . |
| 2110136 | 6/1983 | United Kingdom . |

OTHER PUBLICATIONS

Kieninger Brochure on "Stechwerkzeuge", received Apr. 1982, (7 pages).

Primary Examiner—Nicholas P. Godici
Assistant Examiner—Jerry Kearns
Attorney, Agent, or Firm—A. E. Bahr; E. F. Chapman

[57] ABSTRACT

A blade for a cutting tool is provided having plane parallel faces with V-shaped upper and lower jaws, the jaws being separated at one plane parallel face by a web, the upper and lower jaws being shaped to receive and prevent lateral movement of an insert when retained by the jaws. The insert is shaped to cooperate with the blade. The insert has a cutting edge mounted on a cutting portion separated from the seat portion by a rebate.

12 Claims, 6 Drawing Figures

CUTTING TOOL

This is a continuation of co-pending application Ser. No. 657,297 filed on Oct. 3, 1984 and now abandoned.

BACKGROUND OF THE INVENTION

The present invention relates to a cutting tool and in particular to a grooving or parting-off tool having a removable insert. More particularly, the invention is concerned with a parting-off tool in which an insert is retained securely within the parting-off tool without need for special clamping devices.

Parting-off tools using removable inserts are well known. In particular, U.K. Pat. No. 1,379,637 describes a cutting tool, for example, a parting or groove cutting tool having a plate-like holder. An integral arm is adapted to clamp a cutting insert within the holder, the clamping pressure on the cutting insert resulting from bending of the arm. A surface on the arm presses against one face of the insert while other faces of the insert engage surfaces on the holder. The insert may be released from or inserted into the holder when the arm is urged away from the insert by inserting an elliptical section rod in a slot portion. The elliptical section rod acts as a cam on turning which opens the arm and reduces pressure against the face of the insert. The disadvantage of the groove cutting tool of U.K. Pat. No. 1,379,637 is that the clamping pressure results solely from the bending of the arm. During groove cutting, extreme forces are applied to the insert which causes the arm to open allowing the insert to move within the holder.

U.K. patent application Ser. No. 2,064,390A describes a rotary cutting tool using a cutting element peripherally disposed on a disc. Each of the cutting elements frictionally engages the surface in the disc formed in a "V" shape. A problem with cutting tools of this type is that the jaws retaining the cutting insert are opened by the forces on the insert pushing the cutting insert into the "V". While this may not be significant on a rotary saw which is constantly advancing, it presents problems in fine machine grooving and parting off.

In U.K. Pat. No. 2,082,485 there is described a cut-off tool having a support blade with upper and lower jaws shaped for receiving an insert. The upper jaw 108 is flexible and provides the clamping means on the insert. A second aperture is positioned in the support blade such that the upper jaw is bound by the upper apertures and remains flexible. An actuating member is mounted in an opening which communicates with the second aperture such that a camming action causes the upper jaw to clamp the top surface of the insert. This arrangement overcomes some of the problems which are posed by the integral arm clamping means of U.K. Pat. No. 1,379,637. However, movement of the actuating member can cause shifting of the clamping member on the insert, particularly if the actuating member becomes worn or is badly fitted into the cutting tool.

Cutting inserts are retained in a holder for rotary tools in U.K. patent application Ser. No. 2,110,136A and in European patent application Ser. No. 0,059,602, by the geometrical characteristics of the holder and the insert, by means appearing identical to the retention system disclosed in U.K. patent application Ser. No. 2,064,390A. The holder includes jaw-like seats for the inserts wherein the contour of the seat matches the contour of the tool holder, and there is no clamping means requiring a minimum thickness of the holder or taking up valuable space on the periphery of the tool. The geometry which is responsible for retaining the cutting insert in the holder in these prior art devices, includes the substantially wedge shape of the inserts with prismatic or multiple plane retaining surfaces and the matching wedge shaped surfaces, respectively, of the seats. In these prior art patent applications, the inserts are located in the seats in the tool holder by means of an insertion force, and the inserts are not retained by external clamps, but instead by "wedge" forces. Although convex/concave or concave/convex shapes of the retaining surfaces of the seats and the inserts may provide some stability of the insert in the tool with respect to side forces, it is desirable to improve the stability to all forces and to simplify the means for retaining inserts in blades for cutting tools.

SUMMARY OF THE INVENTION

Accordingly, it is the primary object of the present invention to provide an improved blade for a cutting tool.

Another object of the present invention is to provide an improved grooving or parting-off tool having a removable insert.

It is another object of the present invention to provide improved means for securing a cutting insert in a grooving or parting-off tool.

Other objects and advantages of the invention will become apparent as the description thereof proceeds.

These and other objects are achieved by providing a blade for a cutting tool, the blade having plane parallel faces with at least one aperture having upper and lower jaws for the retention on an insert, the jaws being separated at one plane parallel face by a web, the upper and lower jaws being shaped to receive and prevent lateral movement of the insert when retained by the jaws.

The present invention attempts to overcome the problems of the prior art by providing a device which can locate and clamp securely a cutting insert in a parting-off or grooving tool.

According to various embodiments of the present invention, there is provided a blade having plane parallel faces with at least one pocket, recess or aperture having tapered or V-shaped upper and lower jaws for the retention of an insert, the jaws being separated at one plane parallel face by a web, the upper and lower jaws being shaped to receive and prevent lateral movement of the insert when retained by the jaws.

In a preferred embodiment, the upper and lower jaws have a dovetail shape. The distance between the jaws may be wider adjacent the web and narrower towards the plane parallel face opposed to the web. The purpose of the dovetail shape is to retain a corresponding dovetail-shaped insert within the jaws such that the jaws on one planar face are restricted by the web and on the other planar face are restricted by the narrower jaw mouth. The insert is preferably removable and has a corresponding dovetail shape which mates with the dovetail shape or any other geometrical shape of the jaws.

The upper and lower jaws are preferably tapered or V-shaped, that is, wider from a point at one extent on the plane parallel face nearest the cutting edge to a narrower point away from the cutting edge. Preferably the upper and lower jaws extend to an aperture, rather than come to a fine V-point. This aperture may be circular to enable a rod or screwdriver tip to be inserted to facilitate removal of the insert from the jaws.

BRIEF DESCRIPTION OF THE DRAWINGS

The present invention will be better understood when considered in connection with the following description and drawings, in which.

DETAILED DESCRIPTION OF THE INVENTION

Figure 1:
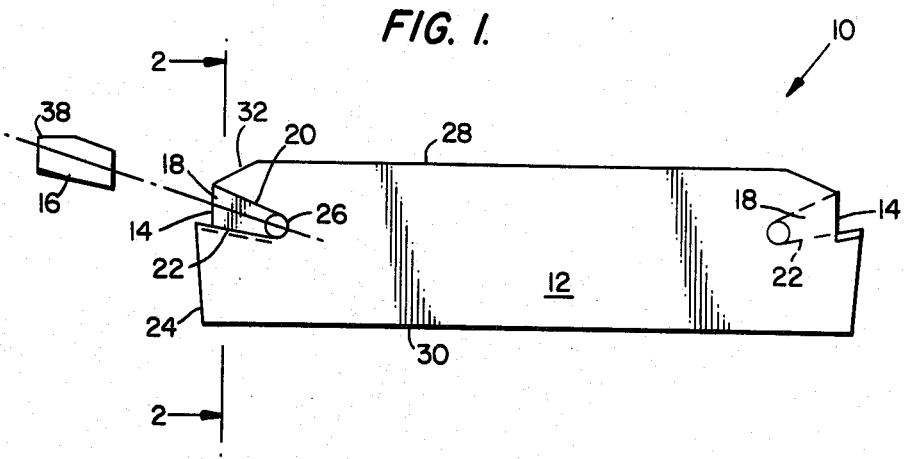
FIG. 1 is a side view of a tool-holder and cutting insert.

Referring to the Figures, the same reference numerals are used for the same component or portion of the apparatus depicted in each of the Figures.

A parting tool 10 has a blade 12 in the form of a planar support blade having plane parallel surfaces or faces. A pocket, recess or aperture 14 at each end of the blade 12 is adapted to receive an insert 16. One planar side surface or face of the blade 12 is connected by a web 18, leaving the other of the plane parallel side surfaces or faces open in an area which corresponds sustantially to web 18. The pocket, recess or aperture 14 has two jaws, an upper jaw 20 and a lower jaw 22 which are tapered or V-shaped away from the leading edge 24 of the blade 12. Although the upper and lower jaws 20 and 22 may taper to a fine point forming an actual "V", it is preferred that the taper terminate in an aperture 26. The aperture 26 is preferably circular and passes perpendicularly through the planar surfaces of the blade 12.

The blade 12 is bound by two parallel edges or surfaces, an upper edge or surface 28 and a lower edge or surface 30 (also referred to herein as base edge or surface 30. The leading edge 24 extends to the lower jaw 22 and via the web 18 to the upper jaw 20. An edge or surface 32 extends from the upper jaw 20 to the top edge or surface 28. The edge or surface 32 is set back from the jaw 20 to allow operating clearance for the insert 16 for removal of the chips during a grooving or parting-off operation.

Figure 2:
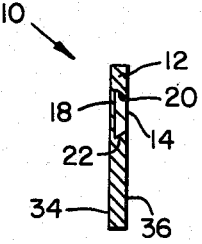
FIG. 2 is an axial view of the cutting insert along the line 2—2 of FIG. 1.

With particular reference to FIG. 2, the web 18 extends between the upper jaw 20 and the lower jaw 22 connecting the planar side surface 34 of the blade 12, leaving the jaws 20 and 22 open on the planar parallel face opposite web 18, that is, on the planar side surface 36. To provide maxmimum strength for the blade 12, the web 18 needs to be as thick as possible. However, to provide sufficient cutting strength in the insert 16, the insert also needs to be as thick as possible. Thus, the thickness of the web 18 is such that it provides sufficient strength between the jaws 20 and 22 to prevent the jaws from being pressed apart. However, the web is as narrow as possible to allow the insert 16 to retain its maximum strength. While not being bound by any specific dimensions for the present invention, the thickness of the blade 12 between the planar side surfaces 34 and 36 is preferably about 4 to about 8 times as thick as the web 18.

The web 18 prevents the insert 16 from being laterally ejected from the jaws 20 and 22 on the planar side 34 of the tool-holder 12. Web 18 also provides continuity in the structure of the blade on one planar side at the cutting edge portion of the blade and contributes to the structural rigidity of the upper and lower jaw members. The absence of a web member or structure in the prior art retention devices causes the jaws or arms to open or to flex allowing the insert to move within the aperture, recess or pocket of the blade or holder. The blade of the present invention having web 18 extending between upper jaw 20 and lower jaw 22 on one plane parallel side face of the blade, illustrated as planar side 34 in FIG. 2, has overcome this prior art disadvantage, and insert 16 when retained by jaws 20 and 22 does not move within the aperture, recess or pocket 14 of blade 12, even when extreme forces are applied to the insert during groove cutting or other similar operations. The dovetail pocket 14 prevents the insert 16 from being ejected on the opposite side.

Figure 3:
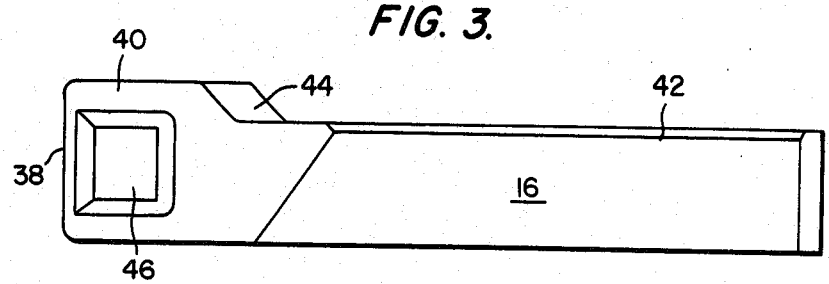
FIG. 3 is a top view of the cutting insert suitable for the tool-holder of the arrangement shown in FIG. 2.
Figure 4:
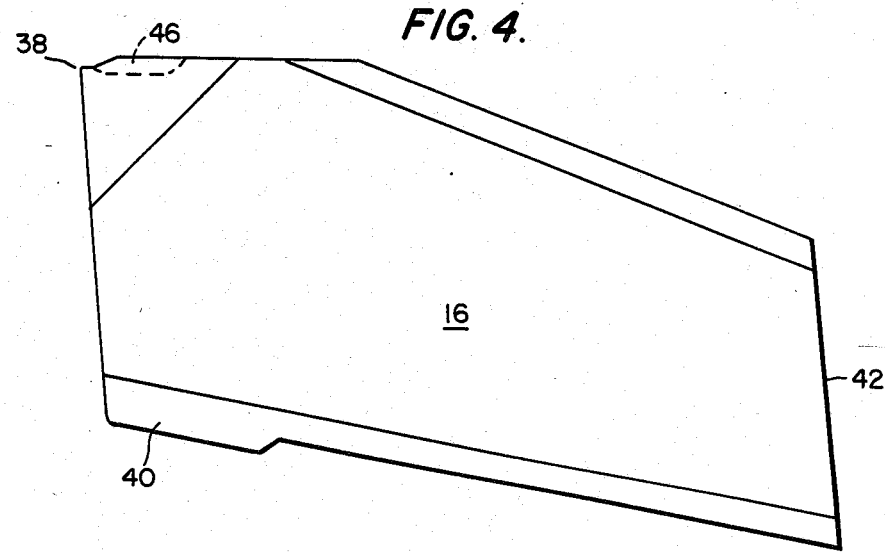
FIG. 4 is a side view of the cutting insert.
Figure 5:
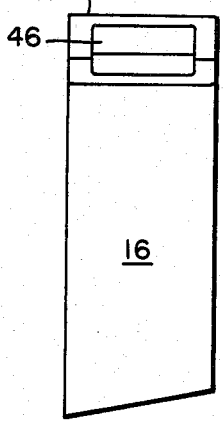
FIG. 5 is a end view of cutting insert.

FIGS. 3 to 5 show the insert which may be used with the tool-holder of the present invention. The shape of the insert 16 is such that it co-operates with the tool-holder. The insert 16 has a cutting edge 38 on insert cutting portion 40, the cutting portion 40 being substantially the same width as the blade 12. The cutting edge 38 is wider than the width of the blade 12. The cutting edge portion 40 extends from the seat portion 42 which co-operates, when in position, with the upper and lower jaws 20 and 22 and the web 18. Thus, the width of the seat portion 42 is less than the cutting edge portion 40, the two portions having a rebate 44 between them. This rebate allows the width of the seat portion 42 to accommodate the web and to increase to the width of the cutting portion 40. The cutting portion 40, when viewed as in FIG. 3, can be seen to increase in width from the rebate 44 to the cutting edge 38 such that the cutting edge 38 is wider than the width of the tool-holder or seat portion 42.

In one specific embodiment of the present invention, there is provided a cutting tool arrangement comprising, a blade having at least one leading edge surface located between planar sides 34 and 36 in FIG. 2 and two opposite plane parallel side faces 34 and 36 with at least one aperture, recess or pocket 14 having upper and lower jaws 20 and 22 for the retention of an insert 16, the jaws 20 and 22 being separated at one plane parallel side face 34 by a web 18, the upper and lower jaws 20 and 22 being shaped to receive and prevent lateral movement of the insert 16 when retained by the jaws 20 and 22, and an insert 16 positioned in the aperture, recess or pocket 14, the insert 16 having on one end a seat portion as shown in FIG. 3, and having walls which correspond to the geometrical configuration of the upper and lower jaws 20 and 22 and the web 18 of the blade 12, and on the other end of the insert 16 a cutting portion 40 having a cutting edge 38. In preferred embodiments, aperture, recess or pocket 14 is tapered or V-shaped away from the leading edge 24 of blade 12 with the wider portion of the aperture, recess or pocket 14 being at leading edge surface 24.

Behind the cutting edge 38 is a chip-breaker groove 46 of conventional type. While a specific chip-breaker groove has been shown in FIGS. 3, 4 and 5, this is not an essential feature and can be omitted or be of a different type, depending on the use of the grooving or parting-off tool. The chip-breaker of the type shown causes the metal which has been cut to curl and break.

Figure 6:
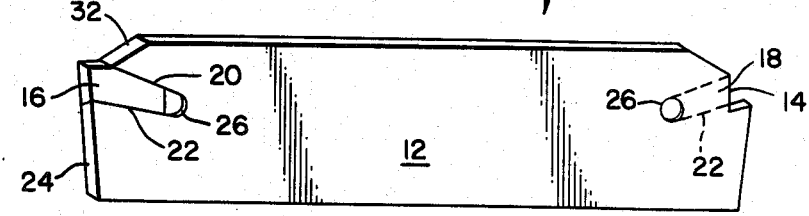
FIG. 6 is a perspective view of the tool-holder of the present invention with the cutting insert in its operative position.

Although the parting-off tool has been defined, in particular with reference to a single insert, the parting-off tool may be constructed for such a single insert alone or may be two-ended, such that it may be reversed, and a second insert be applied to the workpiece as shown in FIGS. 1 and 6.

In operation, the dovetailed insert 16 is positioned between the upper jaws 20 and 22, abutting the web 18 of the blade 12. The blade 12 is clamped into the machine tool. The forces applied to the cutting edge 38 cause the insert to be gripped between the jaws 20 and 22. Because these jaws 20 and 22 are tapered, they retain the insert in static position along the longitudinal axis of the blade 12. The dovetail arrangement of the jaws 20 and 22 in conjunction with the web 18, provide lateral positioning of the insert 16. As shown in FIG. 2 of the drawings, jaws 20 and 22 are wider adjacent web 18 and narrower toward the plane parallel face or surface opposite web 18, that is, narrower toward planar side or surface 36. The corresponding insert which is retained in the dovetailed arrangement of jaws 20 and 22, has a dovetailed seat portion 42 as shown in FIG. 3, wherein the wall of the seat portion which corresponds to the jaws of the blade adjacent the web is wider than the wall of the seat portion which corresponds to the jaws toward the plane parallel face opposed to the web. Because there is no specific clamping device, such as a locating screw, clamp, and the like, the insert 16, after use, is easily removed by passing a small rod (not shown) through the aperture 26 forcing the insert 16 from the jaws 20 and 22. A range of inserts 16 may be provided with different widths of cutting edges 38 for a specific blade 12. Alternatively, different sizes of inserts 16 may be provided for different sizes of blades 12.

The tapered seat for the insert between the jaws 20 and 22, and abutting the web 18, locates the insert securely. The web 18 prevents the jaws 20 and 22 from being forced apart under the machine forces. In addition, the web 18 between the jaws 20 and 22, stiffens the top part of the jaw 20 and prevents any lateral movement during machining. Although it is important to have a taper angle for the insert 16 to form substantially V-shaped upper and lower jaws 20 and 22, because of the presence of web 18, the criticality of the form, shape and angle are eliminated.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed is:

1. A cutting tool having a blade and a cutting insert, the blade having plane parallel faces with at least one pocket having tapered or V-shaped upper and lower jaws for the retention of the insert, the jaws being separated at one plane parallel face by a web, the thickness of the blade being about 4 to about 8 times as thick as the web, the upper and lower jaws of the blade being shaped to receive and prevent lateral movement of the insert itself when retained by the jaws, the insert having at least one cuting edge, the length of which is greater than the width of the blade.

2. A cutting tool as set forth in claim 1, wherein the upper and lower jaws of the blade extend to an aperture.

3. A cutting tool as set forth in claim 2, wherein the aperture is circular.

4. A cutting tool as set forth in claim 1, wherein the upper and lower jaws of the blade have a dovetail shape, the jaws being wider adjacent the web and narrower towards the plane parallel face opposed to the web.

5. A cutting tool as set forth in claim 1, further comprising a cooperating insert.

6. A cutting tool arrangement comprising a blade and a cutting insert, the blade having at least one leading edge surface and two opposite plane parallel side faces with at least one pocket having upper and lower jaws for the retention of the insert, the jaws being separated at one plane parallel side face by a web, the thickness of the blade being about 4 to 8 times as thick as the web, the upper and lower jaws of the blade being shaped to receive and prevent lateral movement of the insert itself when retained by the jaws, and an insert positioned in the pocket, the insert having on one end a seat portion having walls which correspond to the geometrical configuration of the upper and lower jaws and the web of the blade, and on the other end a cutting portion having a cutting edge, the cutting edge of the insert having a length greater than the width of the blade.

7. The cutting tool arrangement of claim 6, wherein the pocket is tapered or V-shaped away from the leading edge of the blade with the wider portion of the pocket being at the leading edge surface.

8. The cutting tool arrangement of claim 6, wherein the upper and lower jaws extend to an aperture.

9. The cutting tool arrangement of claim 8, wherein the aperture is circular.

10. The cutting tool arrangement of claim 6, wherein the upper and lower jaws of the blade have a dovetail shape, the jaws being wider adjacent the web and narrower towards the plane parallel face opposed to the web.

11. The cutting tool arrangement of claim 6, wherein the seat portion of the insert has a dovetail shape, the wall of the seat portion which corresponds to the jaws adjacent the web being wider and the wall of the seat portion which corresponds to the jaws toward the plane parallel face opposed to the web being narrower.

12. The cutting tool arrangement of claim 6, wherein the insert further comprises a rebate betwee the cutting edge portion and the seat portion, and the width of the seat portion is less that the width of the cutting edge.

* * * * *